United States Patent [19]

Krausz

[11] Patent Number: 5,271,648
[45] Date of Patent: Dec. 21, 1993

[54] CLAMPING AND CONNECTING MEANS

[76] Inventor: Eliezer Krausz, 10 Soutine Street, Tel Aviv, Israel

[21] Appl. No.: 902,571

[22] Filed: Jun. 22, 1992

[51] Int. Cl.$^5$ .............................................. F16L 19/00
[52] U.S. Cl. ...................... 285/373; 285/419; 285/424; 24/279; 24/335
[58] Field of Search .............. 285/373, 419, 253, 367, 285/410, 424; 24/279, 335

[56] References Cited

U.S. PATENT DOCUMENTS

| | | | |
|---|---|---|---|
| 549,466 | 11/1895 | Seaman | 24/335 X |
| 1,505,883 | 8/1924 | Gleason | 24/279 |
| 1,553,081 | 8/1925 | Humes | 24/279 |
| 2,351,858 | 6/1944 | Ingalls | 24/335 X |
| 2,809,584 | 10/1957 | Smith | 24/279 |
| 2,828,525 | 4/1958 | Gail | 24/279 |
| 2,874,441 | 2/1959 | Duane | 24/279 |
| 2,895,197 | 7/1959 | Agne et al. | 24/279 |
| 2,938,690 | 5/1960 | Castle | 24/279 |
| 3,268,946 | 8/1966 | Case | 24/335 X |
| 3,944,265 | 3/1976 | Hiemstra et al. | 285/419 |
| 4,261,600 | 4/1981 | Cassel | 285/419 X |
| 4,312,526 | 1/1982 | Cassel | 285/419 |
| 4,364,588 | 12/1982 | Thompson | 285/419 |
| 4,629,226 | 12/1986 | Cassel et al. | 285/424 X |
| 4,655,072 | 4/1987 | Miyoshi | 24/335 X |
| 4,813,720 | 3/1989 | Cassel | 285/424 X |

FOREIGN PATENT DOCUMENTS

| | | | |
|---|---|---|---|
| 386584 | 12/1923 | Fed. Rep. of Germany | 24/279 |
| 300907 | 4/1929 | Fed. Rep. of Germany | 24/279 |
| 3504978 | 8/1986 | Fed. Rep. of Germany | 285/410 |
| 104484 | 3/1917 | United Kingdom | 24/279 |
| 572655 | 2/1946 | United Kingdom | 24/279 |
| 583719 | 1/1947 | United Kingdom | 24/279 |

*Primary Examiner*—Randolph A. Reese
*Assistant Examiner*—Heather Chun
*Attorney, Agent, or Firm*—Edwin D. Schindler

[57] ABSTRACT

A clamp-coupling and repairing apparatus is disclosed, which is useful for fluid conducting pipe-and-hose conduits adapted to withstand high pressure, and which includes a relatively wide band relative to the diameter of a respective conduit. The band is bent to form a circular sleeve-like structure having two free edge portions which are bent to extend radially outwardly of a space defined by the circular sleeve-like structure. Two partly circular plate members are laid against the edge portions with through-going partial longitudinal holes being provided in the circular plate members and the edge portions. A screw bolt is then able to be passed through the longitudinal holes with nuts secured onto said screw bolt for pressing the circular plate members toward one another for tightening the circular sleeve-like structure around the respective conduit. Finally, two bodies of partly spherical outline are positioned against outer surfaces of the two circular plate members with the two bodies being traversed by the screw bolt for ensuring a final parallelism of the two circular plate members when pressed against one another.

4 Claims, 5 Drawing Sheets

CLAMPING AND CONNECTING MEANS

FIELD OF INVENTION

The present invention relates to clamping, coupling and connecting means to be used and with pipes of different material and also with hose like fluid conduits of plastics, rubber or like materials.

There are known and exist many types of conduits for fluids, such as water pipes, sewage pipes, gas, oil pipes and others as well as hose like conduits, these latter are composed of pipe or hose sections which are connected to each other by various connecting means.

There are known also in the trade a large number of connecting and coupling means of different configurations and build.

The present invention relates to the kind known as clamp couplings, and are used also, but not exclusively for the repair of metal or synthetic material conduits which have sprung a leak, especially in cases where the immediate and speedy repair is mandatory in order to avoid loss of the respective fluid, be it liquid or gaseous, and the possible environmental damage which might be a consequence of such leak.

In its broadest aspects such means comprise a relatively wide metal band provided with a locking system, the said band being designed to be placed around a pipe or hose, such that by means of the unique locking system could be tightened around the said conduit.

The present invention relates to such clamping and coupling means of the type referred to—and more particularly to—the locking or fastening means thereof.

OBJECTS OF THE PRESENT INVENTION

It is an object of the invention to provide coupling means for repair of pipes.

It is a further object of the invention to provide a coupling which could be easily fitted on the damaged place and easily tightened around it.

It is yet a further object of the invention to provide such coupling which could also be used for connecting two pipe ends.

BRIEF DESCRIPTION OF THE DRAWING FIGURES

The invention will now be described with reference to the annexed drawings in which:

FIG. 1 is a plan view of the new means, while

FIG. 5 is a plan view of the preferred embodiment of the invention, while

DETAILED DESCRIPTION OF THE DRAWING AND PREFERRED EMBODIMENT

Figure 1:
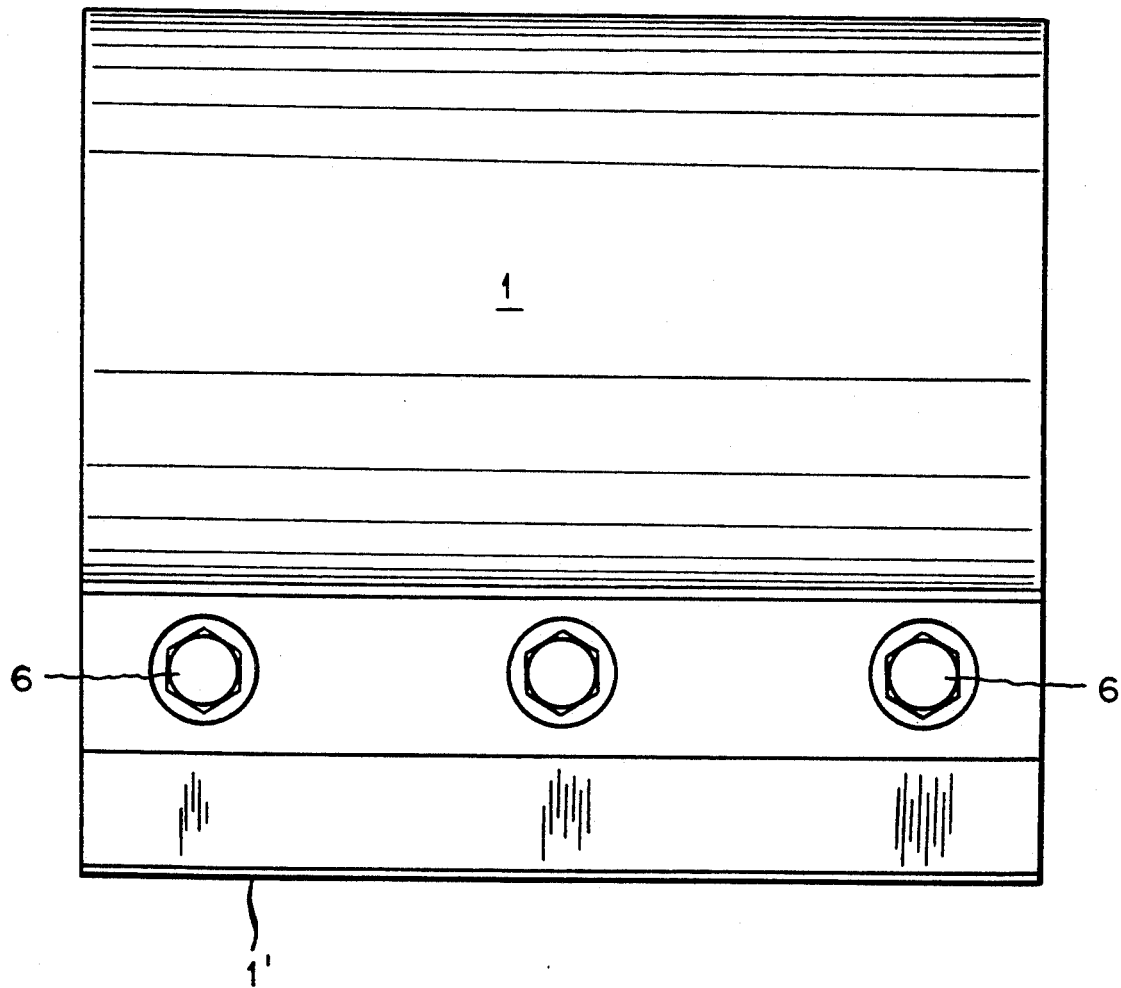
Figure 2:
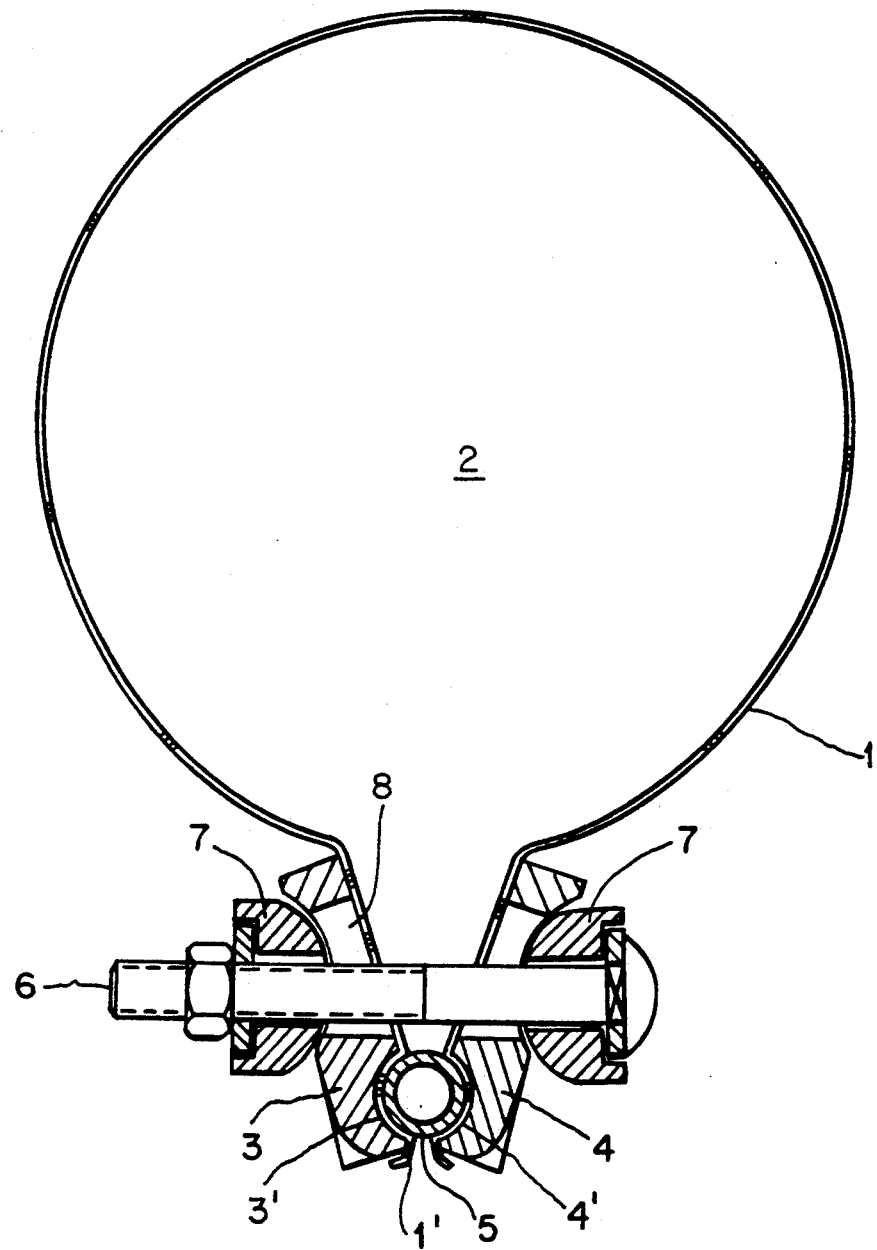
FIG. 2 is an end view thereof.

Turning first to FIG. 1, the clamping and coupling means comprise the metal band 1. In practice, when actually used, the band is placed in a sleeve like manner around the two pipe ends to be connected, possibly with the interposition of a packing, or around the conduit which has sprung a leak, at the damaged part thereof, whereupon both free edge portions 1' of the sleeve 1 are extended and bent radially outwardly of the circular space 2 of the sleeve 1.

Two complementary plates 3 and 4, at one edge of each, there is provided a semi circular cut-out 3',4', being placed facing one another form a combined space occupied by a rod or pipe 5. These plates 3,4 are placed on the edge portion 1'. The section of pipe 5 placed within the space formed by the two bent marginal portions of the circular band 1 acting as an axis as will be referred to. A plurality of nuts and bolts 6 is provided. The bolts passing through plates 3,4 and extension 1'. The bolts pass through semi-spherical pressure shoes 7, so said nuts and bolt heads are in register with the semi-spherical bodies 7 which are seated within bore 8 in plates 3,4.

By tightening bolts 6, section 1' are drawn together in an obvious manner. Spherical bodies 7 enable said nuts and bolts to remain parallel to each other.

Figure 3:
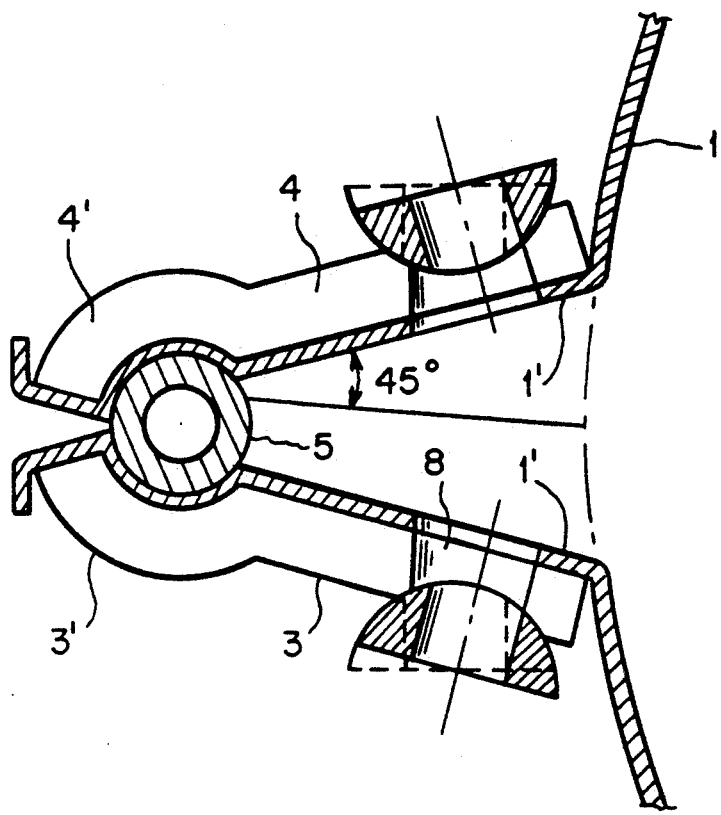
FIGS. 3 and 4 illustrate the "open" and "locked" positions of the new means.
Figure 4:
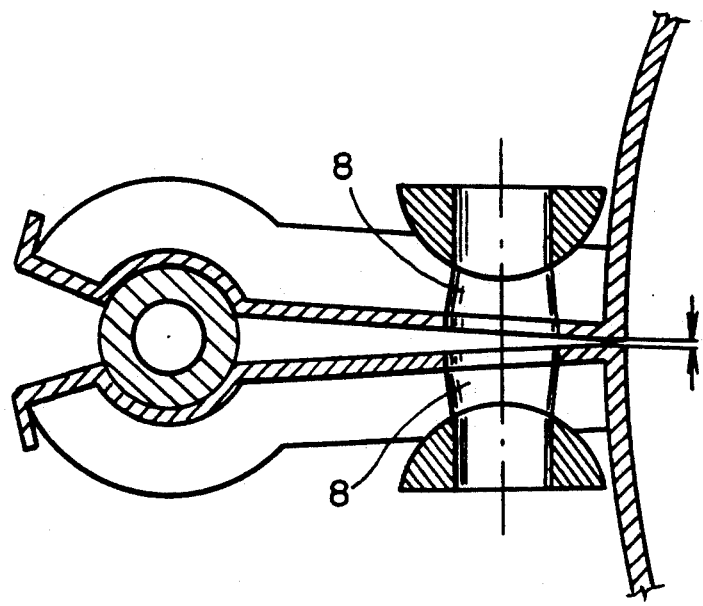

FIGS. 3 and 4 illustrate the "open" and "closed" positions of a clamp. It is clearly seen that pipe 5 acts as an axis when bolts 6 are tightened.

Figure 5:
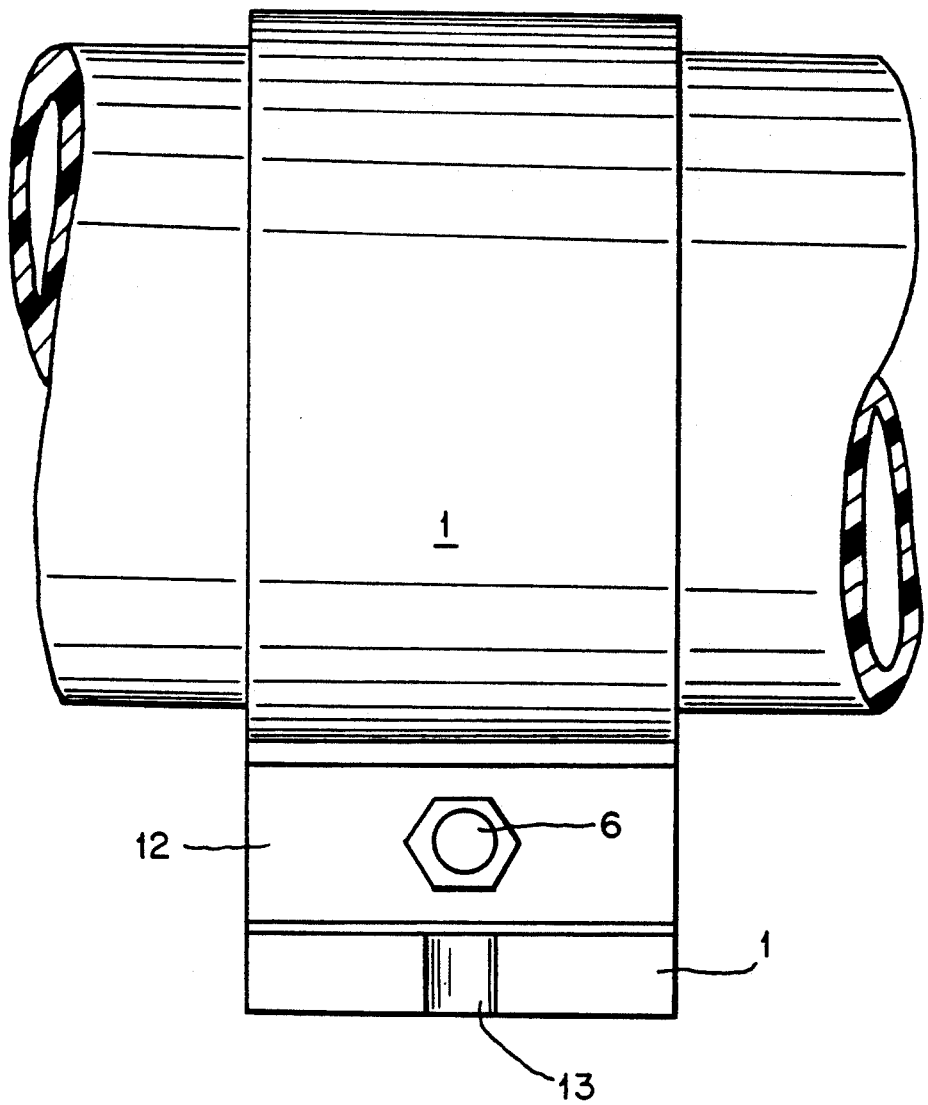
Figure 6:
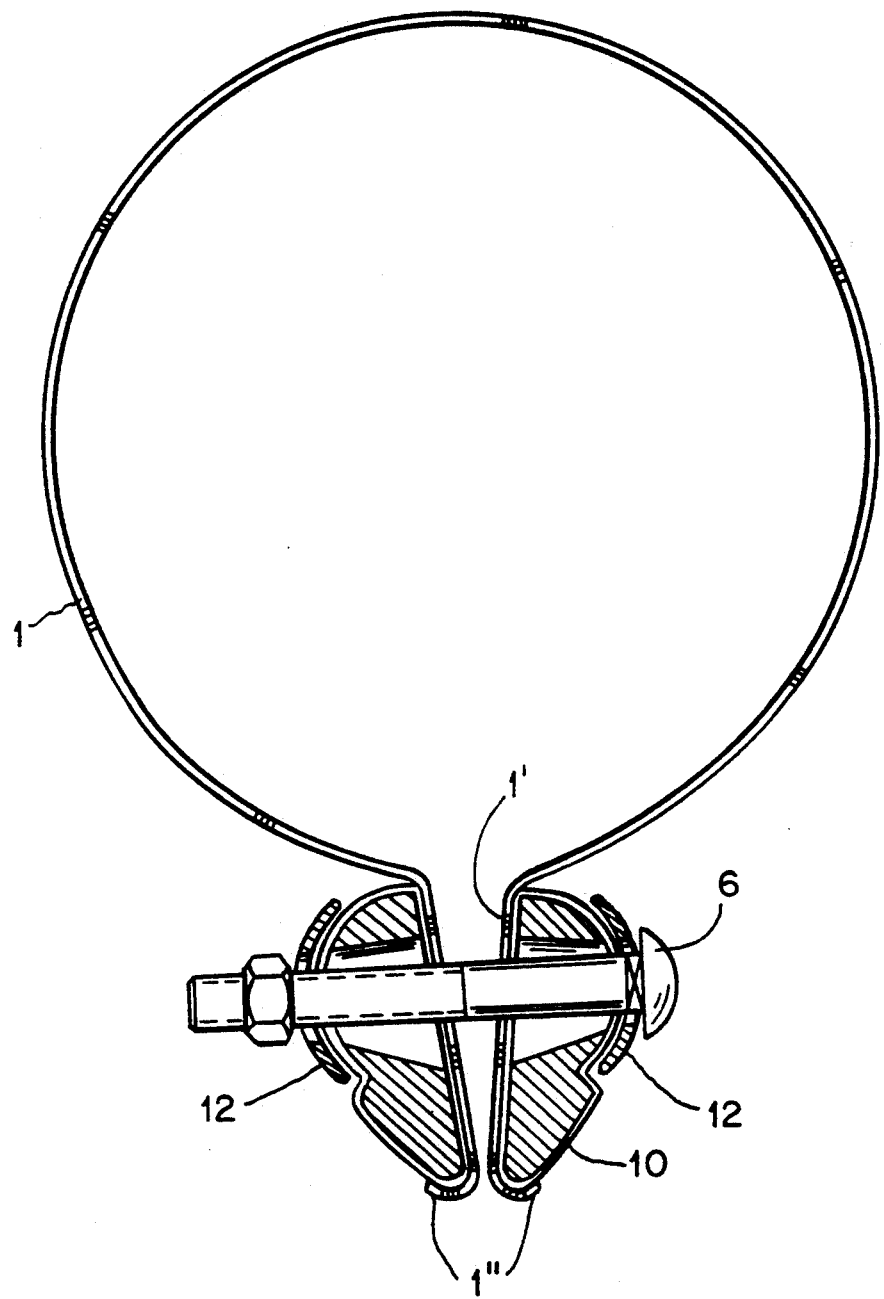
FIG. 6 is an end view thereof.

FIGS. 5 and 6 illustrate the preferred embodiment of the invention. Likewise sleeve 1 is provided with free edge portion 1', however these being extended and bent around a rigid body 10. Bolts 6 pass through bores 8 and through semi spherical pressure plate 12. One of the two edge portions 1' is provided with a slot 13 which makes it possible to secure, or to remove, the sleeve without fully removing bolt 6 by simply somewhat lifting said edge portion so that bolt 6 would pass out of the slot 13.

By tightening bolt 6 sections 1' are drawn together in an obvious manner. Semi-spherical pressure plates 12 enable said nut to remain in the same position. By tightening the extreme edge 1" of extension 1' it establishes contact and acts as an axis.

I claim:

1. A clamp-coupling and repairing apparatus for fluid conducting pipe-and-hose conduits adapted to withstand high pressure, said apparatus comprising:

a relatively wide band relative to the diameter of a respective conduit, said band being bent to form a circular sleeve-like structure having two free edge portions being bent to extend radially outwardly of a space defined by said circular sleeve-like structure, said free edge portions being further bent to reinforce said free edge portions;

two partly circular plate members laid against said edge portions with through-going partial longitudinal holes being provided in said circular plate members and said edge portions:

a screw bolt being passed through said longitudinal holes with nuts secured onto said screw bolt for pressing said circular plate members toward one another for tightening said circular sleevelike structure around the respective conduit; and, two bodies of partly spherical outline being positioned against outer surfaces of said two circular plate members, said two bodies being traversed by said screw bolt for ensuring a final parallelism of said two circular plate members when pressed against one another.

2. The clamp-coupling and repairing apparatus according to claim 1, wherein said band is made of metal.

3. The clamp-coupling and repairing apparatus according to claim 1, wherein a cylindrical article is positioned between said two circular plate members for acting as a turning axis for said circular plates.

4. The clamp-coupling and repairing apparatus according to claim 1, wherein one of said free edge portions includes a slot therethrough.

* * * * *